United States Patent Office 2,902,457
Patented Sept. 1, 1959

2,902,457

MANUFACTURING PROCESS FOR SYNTHETIC DRYING OILS

Charles J. Marsel, New York, and John Happel, Yonkers, N.Y.

No Drawing. Application April 30, 1956
Serial No. 581,285

6 Claims. (Cl. 260—23)

This invention relates to drying oil compositions and more particularly to certain improved synthetic drying oils and coating compositions and to processes for making them. The invention more particularly pertains to the preparation of homogeneous drying oil polymers by reacting selected polymerizable non-benzenoid acetylenes with drying oils, the acetylenes having at least two carbon to carbon unsaturated bonds.

Many of the natural drying oils used for surface coatings have the disadvantage that they dry and harden slowly. Consequently, there have been numerous efforts to modify these oils chemically to improve their properties. For instance U.S. Patent 2,078,194 describes a process in which non-benzenoid acetylenes are reacted with drying oils to obtain homogeneous products. The method described therein is somewhat impractical, particularly on a commercial level, since excess acetylene monomer is used and this must be distilled away at the end of the reaction. Moreover the use of divinyl acetylene as described in such processes, has been found to give products which are impact sensitive, which limits its use and may, in fact, be dangerous.

Divinyl acetylene and its known polymers are known to be impact sensitive, and particularly so if peroxides have had any opportunity to form.

In some cases such chemicals as dibasic acids and chlorinated butadienes were used to obtain homogeneous products. Butadienestyrene copolymers, and cyclopentadiene polymers have also been used. However, there is no doubt that acetylenic materials, and in particular conjugated acetylenic-olefinic systems, impart excellent properties to any drying oil preparation because their structures give the oil unusual and valuable properties including extreme reactivity.

It is therefore an object of this invention to produce a chemically modified drying oil in which acetylene monomers are added to the drying oil and substantially all of which are reacted; thus no unreacted monomer need be distilled or otherwise separated or removed. The resulting modified oils dry rapidly, and are hard, resistant to the action of solvents, flexible and have good adhesion. Another object is to react a monomer such as methyl divinyl acetylene with drying oils, which yields products more stable to impact than the divinyl acetylene preparations as previously disclosed.

A more specific object relates to the copolymerization of methyl divinyl acetylene with drying oils or drying oil modified resins such as polyesters (alkyds), epoxides (bisphenol-epichlorohydrin condensates), phenol-formaldehyde resins and varnishes. Other objects of the invention will be apparent from the following description of the invention.

These objects are accomplished in their preferred form by the process in which unsaturated acetylenic monomers (that is, acetylene monomers having at least two carbon to carbon unsaturated bonds) are reacted with an ester of a drying oil acid or the acid itself.

By unsaturated acetylenic monomer is meant a compound having at least two unsaturated bonds and containing an acetylenic bond and at least one other olefinic (carbon to carbon unsaturated) bond. The compound can be for instance a hydrocarbon, alcohol, glycol, acid, ester, amine, amide, or epoxide or the like. Typical examples are listed below:

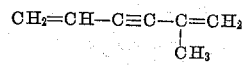

Methyl divinyl acetylene

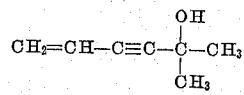

2-methyl-5-hexene-3-yne-2-ol

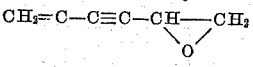

Vinyl acetylene epoxide

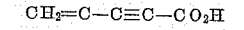

Vinyl acetylene carboxylic acid

Both drying oil acids and esters thereof may be used as the starting materials for the modified drying oils described herein.

By the term drying oil acid is meant an unsaturated organic acid such as linoleic, linolenic, eleostearic, clupanodonic, etc., which generally occur as glycerides in natural drying oils, such as linseed oil, China-wood oil, soya bean oil, fish oil, perilla oil, sunflower seed oil, oiticica oil, rape oil, rubber seed oil, and the like, and which are obtained therefrom by hydrolysis reactions. Also included under the general term "drying oil acid," are synthetically prepared acids, such as sorbic acid, which acids have chemical structures and drying properties similar to those of the drying oil acids obtained from natural sources. In the cases of the esters of the drying oil acids that are useful in the present invention, they can be esters formed by the esterification of polyhydric alcohols, by polybasic acids and/or by drying oil acids. Other esters and resins which are esterified with drying oil acids such as the epons and phenoxy resins can also be used.

The utilization of the simple esters of drying oil acids is illustrated by the following examples in which all parts are by weight unless otherwise indicated.

EXAMPLE 1

Twenty-five parts of freshly distilled methyl divinyl acetylene, boiling between 220–226° F. at a pressure of 760 mm./Hg and containing 1% by weight t-butyl hydroperoxide, is added dropwise to 25 parts of menhaden oil and 25 parts of xylene in a nitrogen atmosphere at 145° C. The addition of methyl divinyl acetylene is regulated so that the oil-solvent temperature does not drop below 140° C. After the addition of all the methyl divinyl acetylene, the refluxing is continued at 145° C. until all of the acetylene compound has reacted.

EXAMPLE 2

2.5 parts menhaden oil
2.5 parts methyl divinyl acetylene
2.5 parts xylene

The methyl divinyl acetylene containing 1% t-butyl hydroperoxide is added dropwise to the oil and xylene previously heated to 145° C. under a $N_2$ atmosphere. The addition of the acetylene compound is regulated so that the oil-solvent temperature does not drop below 140° C. After the addition of all the methyl divinyl acetylene the refluxing is continued at 145° C. A total reaction time of 2 hours is employed.

Increasing the methyl divinyl acetylene content over that of the stoichiometric quantity of the drying oil will increase the tendency to gel. Two experimental reactions were run which indicate this.

EXAMPLE 3

2.5 parts menhaden oil
5.0 parts methyl divinyl acetylene
2.5 parts xylene

The same reacting conditions as in Examples 1 and 2 were used. After a total reaction time of 1½ hours the percent acetylenic monomer content conversion was nearly equal to the oil content.

EXAMPLE 4

Example 3 was repeated but reacted for 2 hours at 145° C. and the product gelled.

EXAMPLE 5

Example 3 was repeated with soya oil. A total reaction time of 1¾ hours was employed.

EXAMPLE 6

Ten parts of methyl divinyl acetylene containing 1% of t-butyl hydroperoxide was added dropwise to 33 parts of menhaden oil and 33 parts of xylene under a $N_2$ atmosphere at 145° C. The addition was regulated so that the oil-solvent temperature did not drop below 140° C. After the addition of all the methyl divinyl acetylene, the refluxing was continued until all the methyl divinyl acetylene was reacted.

EXAMPLE 7

3.3 parts menhaden oil
3.3 parts xylene
1.0 part methyl divinyl acetylene

The reaction conditions were the same as Example 6. The reaction mixture was heated for 2 hours at 145° C.

EXAMPLE 8

Example 7 was repeated with soya oil. The total heating period was 5 hours at 145° C. A 55.6% monomer conversion was obtained.

In case gelation occurs in the reactions, it may be necessary to increase the solvent concentration to a maximum dilution of 70–75% based on the final solids. If the acetylene monomer reacts too slowly then an increase of the catalyst concentration is frequently desirable. Also if the monomer reacts too fast then a decrease of the catalyst concentration is desirable or in extreme cases, it may be necessary to eliminate the catalyst altogether. Thus, the catalyst preferably a peroxide, may be desirable but it is not essential for formation of the modified polymers.

EXAMPLE 9

The following polymer was made:
5 parts methyl divinyl acetylene and
.05 parts benzoyl peroxide
5 parts of $CCl_4$
5 parts of menhaden oil The above mixture was refluxed at 80–85° C. for eight hours to form a modified drying oil.

EXAMPLE 10

Tung oil was substituted for the menhaden oil and a similar type modified drying oil was formed.

EXAMPLE 11

A synthetic drying oil was prepared by reacting oleic acid with 2-methyl-5-hexane-3-yne-2-ol. .05 mole of each of the two monomers were reacted at 125° C., with .2% of p-toluene sulfonic acid added after 3 hours of heating. Heating was continued for about 3 hours and then the product cooled. An oily product was formed with good drying properties.

EXAMPLE 12

A mixture of .01 mole of maleic anhydride and .01 mole of methyl vinyl acetylene was heated at 75° C. for 1 hour. The mixture, after being maintained at 75° C. for a few minutes, became clear and on further heating, gelled. The half-ester product was very reactive to drying.

EXAMPLE 13

Synthetic drying oil was prepared from methyl divinyl acetylene in which it was bulk polymerized with .5% iodine, as a catalyst, at 80–90° C. The reaction time was varied from 4½ hours to 10 hours.

The polymer when spread on a metal surface, dried within 3½ hours to form a hard, lustrous film.

Drying test method

The drying tests of the films were carried out by adding .024 percent cobalt and .048 percent drier (naphthenate, linoleate, octoate, etc.) to the synthetic oil, with solvent added if necessary. The resulting composition was spread on glass test plates in uniform layers and exposed to the atmosphere at room temperature. The "final dry," that is, the time required for the formation of a film which when pressed firmly with the finger and then polished showed no prints, for some of the examples follows.

| Oil from Example No. | Final Dry Time |
| --- | --- |
| 2 | about 16 hours. |
| 3 | about 2 hours. |
| 5 | Do. |
| 10 | 1 hour (tung oil copolymer). |
| Menhaden oil | 72 hours still tacky. |
| Tung oil | Between 4–16 hours (allow to dry overnight). |

Solvent test

The solvents used were xylene and carbon tetrachloride. The solvents used are preferably those in which the copolymers are soluble. The "final dry" films were not dissolved by the solvents, made tacky by them, or removed from the surface.

Besides drying rapidly and being solvent resistant, the films are scratch resistant. In other words scratching with a sharp instrument does not mar the film.

Synthetic drying oils like styrenated oils and styrenated alkyds or styrenated epon esters have the disadvantage that, though they dry rapidly, their solvent and scratch resistant are poor. Thus the acetylenic oil copolymers and modified compositions are superior to natural oils, styrenated oils, styrenated alkyds and styrenated epons in scratch resistant qualities.

Impact stability tests

The following is a comparison of the impact stability test of methyl divinyl acetylene with divinyl acetylene. This test proves that methyl divinyl acetylene has a lower impact stability rating than divinyl acetylene monomer, the polymer therefrom and the polymer treated with oxygen.

| Monomer | Polymer | Impact Stability Rating [1] |
|---|---|---|
| Methyl divinyl acetylene | | 50%. |
| | Methyl divinyl acetylene | 70%. |
| | Methyl divinyl acetylene (after $O_2$ passed in for 1 hr.). | 70%. |
| Divinyl acetylene | | 70%. |
| | Divinyl acetylene | detonates. |
| | Divinyl acetylene (after $O_2$ passed in for 1 hr.). | detonates. |

[1] A high rating denotes increased sensitivity to impact; numerically, 100% minus this value stands for amount of t-butyl peroxy butane necessary to add to obtain detonation (t-butyl peroxy butane will detonate under impact). Thus a value of 90% would indicate that addition of only 10% of t-butyl peroxy butane would give a mixture that detonated.

The natural drying oils used in this invention for the production of modified synthetic drying oils may be used either in their untreated state or they may be subjected before reaction with the methyl divinyl acetylene or other unsaturated acetylene hydrocarbon, to processes known to the art, such as heat treatment, bodying, blowing and curing. Instead of the natural drying oil alone, mixtures of natural drying oils in which natural or artificial gums or resins have been incorporated may be used. Examples of such products are the well-known varnish bases. Oil modified phenol-aldehyde resins i.e., those obtained from linseed, China-wood, soya oil, etc., oils with phenol, naphthol, etc., and aldehydes such as formaldehyde, acetaldehyde, furfural, benzaldehyde, etc., and/or ketones such as acetone, methyl ethyl ketone, acetophenone, etc., may also be used.

In addition to the simple drying oil esters considered above, more complex esters are also capable of combining with high unsaturated hydrocarbons to give modified synthetic drying oils of valuable properties. In such a class are the drying oil modified alkyds. Other useful modifications include epoxide resins reacted with fatty acids, fatty acids reacted with phenoxyalkyl alcohol-formaldehyde resins, and pentaerythritol fatty acid esters.

The reaction between the unsaturated acetylenic compounds and the ester of a drying oil acid may be carried out by heating at any temperature below that at which the ingredients undergo substantial decomposition. In general it has been found that a temperature between 50–200° C. is most suitable for methyl divinyl acetylene. The heating is continued till all the acetylene monomer reacts.

If desired, the rate of reaction may be increased by increasing the temperature or pressure or by catalysts such as benzoyl peroxide, t-butyl peroxide, etc. and by adjusting the concentration of such catalysts. On the other hand, the rate may be decreased by dilution with inert solvents and diluents such as aromatic hydrocarbons. The polymerization reactions are best carried out in the presence of an inert gas such as carbon dioxide or nitrogen. Oxygen is preferably excluded from the reactions since it increases gel formation.

In general, the percentage of methyl divinyl acetylene or other unsaturated acetylenic material combined in the modified synthetic drying oil may be varied from 0 to 50% without gelling and forming rapid drying films.

The products thus obtained by heating together highly unsaturated acetylenic materials and drying oil acids or esters of drying oil acids are more or less viscous, nonvolatile oils of clear to yellow or brown color. They are soluble in hydrocarbons of the aromatic series and are in general miscible with natural drying oils, with polymers of unsaturated hydrocarbon, and with drying oil modified alkyds, as well as with most of the natural and synthetic gums and resins used in the art of varnish making and in preparation of coating compositions. They dry and harden much more rapidly than the natural drying oils, the rate of drying being accelerated by the addition of metallic driers and retarded by antioxidants as is the case of the natural drying oils.

Antioxidants such as phenols, eugenol, guaiacol, cresol, t-butyl catechol and hydroquinone, are useful in preventing a wrinkling of the film surface. The antioxidants function in amounts so small as not to seriously affect the rate of drying. Films containing more than a relatively small amount of combined unsaturrated acetylene hydrocarbon become very hard soon after drying and are not dissolved or softened by organic solvents or water. In these respects they thus differ markedly from the natural drying oils and from the varnishes and coatings made therefrom. On the other hand, the dried films of the products of this invention are flexible and adhere well to metallic and other surfaces, being in these respects markedly superior to the unmodified polymer of unsaturated hydrocarbons such as methyl divinyl acetylene itself.

Either with the addition of solvents or of other film forming materials the products of this invention may be used in general for all purposes for which drying oils and varnishes are used, and because of the valuable properties enumerated above, they yield coating compositions and other products which are in many cases superior to those now in use. Furthermore, these superior properties make the products of this invention useful for many purposes for which no satisfactory products can be made with the materials generally known to the varnish art. Examples of uses in which rapid drying and hardening are particularly desirable and for which new products are therefore particularly suitable are (1) undercoats applied to wood, metal, or other materials in order to form a suitable base for other finishing materials and (2) finishes for floor and furniture.

The modified synthetic drying oils, like the synthetic drying oils prepared from highly unsaturated hydrocarbons preferably after the incorporation of suitable pigments may be used for the protection of the interior of petroleum tanks, interior of steel vessels containing organic solvents, fatty acid, food stuffs and the like, which would otherwise be contaminated by the products of their reaction with the steel or other metal.

The products of this invention may also be used for impregnating cloth and paper and as an adhesive for cloth and paper.

The term synthetic drying oil as used thruout the specification has been chosen as a convenient means for referring to the drying oils constituting the present invention. The term is intended to cover drying oils which may serve as a substitute for the natural drying oils.

The above descriptions and specific examples are illustrative only and are not to be construed as limiting the scope of the invention. Any modification or variation therefrom which conforms to the spirit of the invention is intended to be included within the scope of the claims.

What is claimed is:

1. An improved, impact stable, drying oil composition obtained by heating at temperatures of 50° to 200° C., until substantially complete polymerization of the polymerizable components has occurred, of substantially stoichiometric reactive amounts of a polymerizable acetylenic monomer selected from the group consisting of methyl divinyl acetylene and 2-methyl-5-hexene-3-yne-2-ol with a drying oil composition selected from the group consisting of at least one naturally occurring drying oil, a drying unsaturated acid of such drying oil, and mixtures thereof.

2. An improved drying oil according to claim 1 in which the polymerizable acetylenic monomer is methyl divinyl acetylene.

3. An improved drying oil according to claim 1 in which the polymerizable acetylenic monomer is 2-methyl-5-hexene-3-yne-2-ol.

4. The process which comprises heating at a temperature of 50° to 200° C. until substantially complete polymerization has occurred of substantially stoichiometric reactive amounts of a polymerizable acetylenic monomer selected from the group consisting of methyl divinyl acetylene and 2-methyl-5-hexene-3-yne-2-ol with a drying oil composition selected from the group consisting of at least one naturally occurring drying oil, a drying unsaturated acid of such drying oil, and mixtures thereof.

5. A process according to claim 4 in which the polymerizable acetylenic monomer is methyl divinyl acetylene.

6. A process according to claim 4 in which the polymerizable acetylenic monomer is 2-methyl-5-hexene-3-yne-2-ol.

References Cited in the file of this patent
UNITED STATES PATENTS
2,078,194    Collins _____ Apr. 20, 1937

OTHER REFERENCES

Chem. Abstracts, vol. 36, pages 747, 1296. (Copy in Sci. Libr.)